Patented Dec. 6, 1938

2,139,190

UNITED STATES PATENT OFFICE 2,139,190

AMINO-ACID DERIVATIVES AND THEIR MANUFACTURE

Martin Iselin, Riehen, near Basel, and Jakob Bindler, Basel, Switzerland, assignors to the firm J. R. Geigy S. A., Basel, Switzerland No Drawing. Application December 11, 1936, Serial No. 115,441. In Germany December 23, 1935

20 Claims. (Cl. 260—561)

This invention is an improvement in or modification of that forming the subject of the application Ser. No. 115,440 filed at the same day by the same inventors together with the co-inventor Fritz Becherer, wherein new amino-acid amide derivatives containing a high molecular alkyl radical linked at the amide-nitrogen-atom are described.

According to this invention new amino-acid derivatives which are likewise valuable new compounds are made by condensing a halogen fatty acid amide of the formula

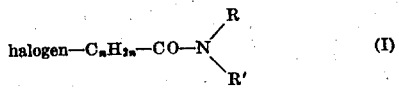

containing easily exchangeable halogen, in which R stands for hydrogen, alkyl containing fewer than 6 carbon atoms, aralkyl or aryl, R' stands for alkyl containing fewer than 6 carbon atoms, cycloalkyl, aralykyl or aryl, and $n$ stands for 1, 2 or 3;

with an amine so as to produce an aminofatty acid derivative of the formula

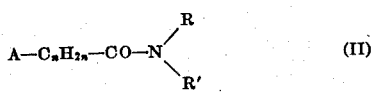

in which

A stands for the radical

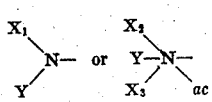

in which $X_1$ stands for hydrogen, an aliphatic radical which, if desired, may be substituted by hydroxyl and/or halogen, an araliphatic, aromatic or hydroaromatic radical, which three latter radicals may be substituted in any desired manner, $X_2$ and $X_3$ have the same meaning as $X_1$ excluding hydrogen, Y stands for a saturated or unsaturated alkyl radical of high molceular weight containing more than 6 carbon atoms and $ac$ stands for an acid radical of a quaternary nitrogen compound.

When the new compounds are not themselves soluble in water they can be converted into water soluble form by treatment with acids or by a subsequent alkylation to quaternary compounds.

The process may consist, for example, in causing a halogen fatty acid amide of general Formula I above to react with a primary aliphatic amine or with a simple or mixed secondary or tertiary amine of aliphatic, araliphatic aromatic or hydroaromatic nature, there being present in each case a saturated or unsaturated alkyl radical of high molecular weight containing more than 6 carbon atoms; in the case of secondary and tertiary amines these may also be further substituted, particularly alkyl radicals which are present may be substituted by hydroxyl and/or halogen. In cases in which the products are not quaternary compounds they may be converted, if required, after alkylation with an alkylating or aralkylating agent which may be unsubstituted or may be substituted by hydroxyl and/or halogen, into water soluble salts by treatment with an acid or into quaternary compounds by further alkylation with one of the aforesaid agents.

According to another procedure in accordance with the invention a halogen fatty acid amide of the above general Formula I is caused to react with ammonia or a primary or secondary unsubstituted or substituted amine of aliphatic, araliphatic, aromatic or hydroaromatic nature, in which alkyl groups present may be substituted by hydroxyl and/or halogen and in the case of secondary amines the amine may be simple or mixed; the compounds thus produced are then treated once or several times with alkylating or aralkylating agents which may be unsubstituted or may be substituted by hydroxyl and/or halogen, in which operation there must be introduced a saturated or unsaturated alkyl radical of high molecular weight containing more than 6 carbon atoms. In so far as the products so obtained are not soluble in water they are converted into water soluble salts by treatment with an acid or into quaternary compounds by subsequent alkylation with one of the aforesaid agents.

The halogen fatty acid amines (I) used as parent materials can be made by causing a halogen fatty acid or the corresponding halogen fatty acid chloride to react with a primary or secondary amine of the formula

in which R stands for hydrogen, an alkyl radical containing fewer than 6 carbon atoms, aralkyl or aryl and R' stands for an alkyl residue containing fewer than 6 carbon atoms, cycloalkyl, aralykl or aryl.

The reaction of these halogen fatty acid amides (I) with amines to produce the aminofatty acid derivatives (II) is conducted according to known methods whereby by the use of ammonia or a primary, secondary or tertiary amine the corresponding primary to quaternary aminogroup take the place of the halogen.

If there is chosen for the reaction an amine (including ammonia) which leads to a primary, secondary or tertiary aminofatty acid derivative (II) the product can afterwards be further alkylated as already indicated above. This may be brought about by means of the customary alkylating agents, for example the mineral acid esters of saturated or unsaturated alcohols of low or high molecular weight such as alkyl, aralkyl or alkylene halides, halogenhydrins, dialkyl sulphates and so on, or by addition of a sulphonic acid ester or the like.

The alkyl residue containing more than 6 carbon atoms, the presence of which in the aminofatty acid derivatives is essential, corresponds with those of the higher alcohols obtainable by reduction of naturally occurring fats, oils, resins and naphthenic acids.

Those of the new products which are not quaternary compounds are frequently, in the form of bases, oils which can easily be distilled in a vacuum and are sparingly soluble or insoluble in water. They can be converted into water soluble substances by any of the methods customary in the case of ammonia derivatives. With inorganic or organic acids they form salts, for example hydrochlorides, sulphates, phosphates, silicofluorates, formates, monochloracetates, oxalates, citrates and tartrates.

The new amino acid derivatives are useful for various purposes. By suitable choice of the components used in their synthesis it is possible to combine particular properties in the same molecule or to render some particular action especially prominent. By reason of the fact that there are present in the amide radical of the halogen fatty acid amide (I) alkyl radicals of low molecular weight, cycloalkyl radicals, aralkyl radicals, or aryl radicals (see first paragraph herein), which are available for substitution in various manners, the possibilities of influencing the properties of the final products are remarkably numerous. Substitution by one or more halogen atoms in the aralkyl or aryl radical for example changes the substantivity or toxicity, whereas substitution by hydroxyl or by nitrogen again gives rise to other effects. There can be obtained in this manner for example textile assistants, such as excellent wetting agents, agents for improving the fastness of direct dyeings towards water, agents for drawing off Naphthol AS-dyeings, agents for imparting a matt appearance to regenerated cellulose or softening agents for textiles. They may also be valuable as agents for combatting animal pests, such as agents for protecting plants, or as agents for protecting against moths. They may also have strong bactericidal or fungicidal properties of intertest.

The following examples illustrate the invention:—

Example 1

1 molecular proportion of chlor- or bromacetic acid dimethylamide is condensed with somewhat more than 2 molecular proportions of lorylamine at 135–140° C. in 12 hours, the excess of lorylamine is removed by extraction of the melt with water and the remaining lorylamino acetic acid dimethylamide is dried on the water-bath and if required distilled (by the term "loryl" used herein is to be understood the alkyl radical corresponding with the mixture of higher alcohols obtainable from coconut oil).

27.1 grams of lorylamino acetic acid dimethylamide are dissolved in equimolecular parts of an aqueous acid, like 5,4 grams formic acid of 85%. By evaporation of the solution there is obtained the soluble formate of the above named base. Instead of formic acid there may be employed muriatic, sulphuric, silicofluoric acid and so on.

Instead of dimethylamine used in making the chloracetic acid dimethylamide used in the above example there may be used other primary or secondary aliphatic and aromatic bases, for example methylamine, diethylamine and the like, aniline and its homologues and monoalkyl, monoaryl or monoaralkyl substitution products and their halogen, hydroxyl or carboxyl derivatives such as monoethylaniline, monomethyl-3-chloraniline, benzylamine, diphenylamine and so on. Instead of lorylamine there can be used lorylaniline or its equivalents such as cyclohexylamine, benzyldodecylamine, naphtheneaniline and so on.

Example 2

18.35 grams of chloracetic acid benzylamide is condensed in a manner similar to the above example with 37 grams of lorylamine. The resulting base is caused to react with equimolecular parts of oxalic acid. The ready soluble oxalate is obtained by evaporation.

By treatment with the usual alkylating or aralkylating agents which may be unsubstituted or substituted, for instance by halogen and/or hydroxyl, the secondary bases obtained as above described can be converted into tertiary bases and these into quaternary compounds.

For preparing the alkyl amine serving as parent material there may be used instead of loryl alcohol or a mineral acid ester thereof any other mixture of alcohols which can be obtained from natural fats or waxes by reduction for example of spermaceti, cotton seed oil etc. So also there may be used a mineral acid ester of an isolated individual higher alcohol such as cetyl, ceryl, stearyl or oleyl alcohol.

Example 3

10.3 parts of dimethylamino acetic acid ethylanilide are heated in the manner described in Example 1 with 12.5 grams of lorylbromide, till complete solubility in water is reached. By evaporation the quaternary bromo-composition is isolated.

Example 4

10.3 grams of dimethylamino acetic acid monoethylamide obtainable according to the usual methods are mixed with 12.5 grams of lorylbromide and the mixture is heated for 3–4 hours at 130–140° C. whilst stirring. The product is completely soluble in water and is isolated by evaporating the resulting solution.

Instead of the two aliphatic amines used in making the parent material for this example there may be used other aliphatic or one or two aromatic primary or secondary amines. There may be named, for example diethylamine, mono- or diethanolamine, γ-chloro-β-hydroxypropylamine, cyclohexylaniline, benzylamine and so on. The possibilities of variation are very great. Some representatives of the parent materials which can be used will now be mentioned: dimethylamino acetic acid chlorobenzylphenylamide, diethylamino acetic acid diphenylamide, piperidino acetic acid monomethylamide, phenylamino acetic acid dimethylamide and so on.

Instead of loryl bromide there may be used another mineral acid ester of an alcohol of high molecular weight or mixture thereof, for example compounds derived from spermaceti-alcohols, oleyl alcohol, cetyl alcohol, stearyl alcohol and so on.

Instead of chloracetic acid derivatives used in the above examples there may be used derivatives of chloropropionic acid, chlorobutyric acid and so on. The reaction products obtained have in general the same or very similar properties.

What we claim is:—

1. A process for making new amino-acid derivatives, which consists in converting a halogen fatty acid amide containing easily exchangeable halogen and having the formula

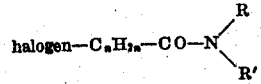

in which
R represents a radical selected from the group consisting of hydrogen, alkyl groups with fewer than 6 carbon atoms, aralkyl and aryl groups,
R' represents a radical selected from the group consisting of alkyl groups with fewer than 6 carbon atoms, cycloalkyl, aralkyl and aryl groups, and
$n$ means one of the numbers 1, 2 and 3,
into an aminofatty acid derivative of the formula

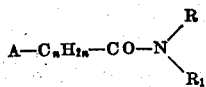

in which
A represents one of the radicals

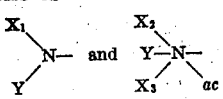

wherein
$X_1$ represents a radical selected from the group consisting of hydrogen, aliphatic radicals, araliphatic, aromatic and hydroaromatic radicals,
$X_2$ and $X_3$ represent the same as $X_1$ with the exception of hydrogen,
Y represents an alkyl radical of high molecular weight containing more than 6 carbon atoms, including both saturated and unsaturated radicals, and
$ac$ represents an acid radical of a quaternary nitrogen compound.

2. A process for making new amino-acid derivatives, which consists in converting a halogen fatty acid amide containing easily exchangeable halogen and having the formula

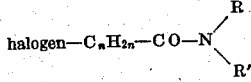

in which
R represents a radical selected from the group consisting of hydrogen, alkyl groups with fewer than 6 carbon atoms, aralkyl and aryl groups,
R' represents a radical selected from the group consisting of alkyl groups with fewer than 6 carbon atoms, cycloalkyl, aralkyl and aryl groups, and
$n$ means one of the numbers 1, 2 and 3,
into an aminofatty acid derivative of the formula

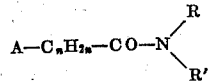

in which
A represents the radical

wherein
$X_1$ represents a radical selected from the group consisting of hydrogen, aliphatic radicals, araliphatic, aromatic and hydroaromatic radicals, and Y represents an alkyl radical of high molecular weight containing more than 6 carbon atoms, including both saturated and unsaturated radicals, and converting the product so obtained into a water soluble form by formation of a salt or a quaternary ammonium compound.

3. A process for making new amino-acid derivatives, which consists in converting a halogen fatty acid amide containing easily exchangeable halogen and having the formula

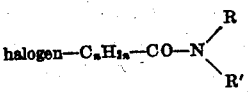

in which
R represents a radical selected from the group consisting of hydrogen, alkyl groups with fewer than 6 carbon atoms, aralkyl and aryl groups,
R' represents a radical selected from the group consisting of alkyl groups with fewer than 6 carbon atoms, cycloalkyl, aralkyl and aryl groups, and
$n$ means one of the numbers 1, 2 and 3,
into an aminofatty acid derivative of the formula

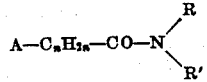

in which A represents an amine selected from the group consisting of primary and secondary aliphatic, araliphatic, aromatic and hydroaromatic amines, whereby the aliphatic radicals present contain at most 6 carbon atoms, and introducing the necessary alkyl radical of high molecular weight containing more than 6 carbon atoms by means of an agent selected from the group consisting of alkylating and aralkylating agents.

4. A process for making new amino-acid derivatives, which consists in converting a halogen fatty acid amide containing easily exchangeable halogen and having the formula

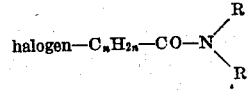

in which
R represents a radical selected from the group consisting of hydrogen, alkyl groups with fewer than 6 carbon atoms, aralkyl and aryl groups,
R' represents a radical selected from the group consisting of alkyl groups with fewer than 6 carbon atoms, cycloalkyl, aralkyl and aryl groups, and
$n$ means one of the numbers 1, 2 and 3,
into an aminofatty acid derivative of the formula

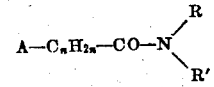

in which
A represents one of the radicals

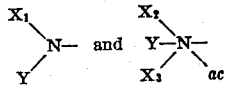

wherein
$X_1$ represents a radical selected from the group consisting of hydrogen, aliphatic radicals, araliphatic, aromatic and hydroaromatic radicals,
$X_2$ and $X_3$ represent the same as $X_1$ with the exception of hydrogen,
Y represents the alkyl radicals of high molecular weight resulting from the alcohols of hydrogenated natural fats, oils, waxes, resins and naphthenic acids, and ac represents an acid radical of a quaternary nitrogen compound.

5. A process for making new amino-acid derivatives, which consists in converting a halogen fatty acid amide containing easily exchangeable halogen and having the formula

in which

R represents a radical selected from the group consisting of hydrogen, alkyl groups with fewer than 6 carbon atoms, aralkyl and aryl groups, R' represents a radical selected from the group consisting of alkyl groups with fewer than 6 carbon atoms, cycloalkyl, aralkyl and aryl groups, and $n$ means one of the numbers 1, 2 and 3, into an aminofatty acid derivative of the formula

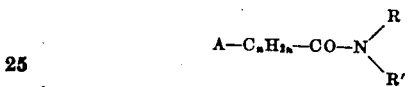

in which

A represents one of the radicals

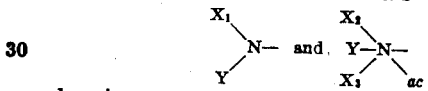

wherein $X_1$ represents a radical selected from the group consisting of hydrogen, aliphatic radicals, araliphatic, aromatic and hydroaromatic radicals, $X_2$ and $X_3$ represent the same as $X_1$ with the exception of hydrogen, Y represents the alkyl radicals of high molecular weight resulting from the alcohols of hydrogenated coconut oil, comprising mainly alkyl radicals from $C_{12}$ to $C_{14}$, and ac represents an acid radical of the quaternary nitrogen compound.

6. A process for making new amino-acid derivatives, which consists in reacting a halogen acetic acid amide containing easily exchangeable halogen and having the formula

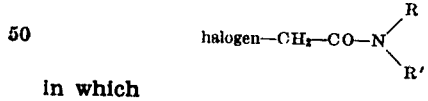

in which

R represents a radical selected from the group consisting of hydrogen, alkyl groups with fewer than 6 carbon atoms, aralkyl and aryl groups, R' represents a radical selected from the group consisting of alkyl groups with fewer than 6 carbon atoms, cycloalkyl aralkyl and aryl groups, into an aminofatty acid derivative of the formula

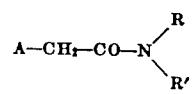

in which

A represents one of the radicals

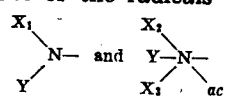

wherein $X_1$ represents a radical selected from the group consisting of hydrogen, aliphatic radicals, araliphatic, aromatic and hydroaromatic radicals, $X_2$ and $X_3$ represent the same as $X_1$ with the exception of hydrogen, Y represents the alkyl radicals of high molecular weight resulting from the alcohols of hydrogenated natural fats, oils, waxes, resins and naphthenic acids, and ac represents an acid radical of a quaternary nitrogen compound.

7. A process for making new amino-acid derivatives, which consists in converting a halogen acetic acid amide containing easily exchangeable halogen and having the formula

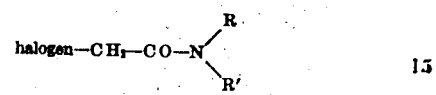

in which

R represents a radical selected from the group consisting of hydrogen, alkyl groups with fewer than 6 carbon atoms, aralkyl and aryl groups, R' represents a radical selected from the group consisting of alkyl groups with fewer than 6 carbon atoms, cycloalkyl, aralkyl and aryl groups, into an aminofatty acid derivative of the formula

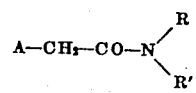

in which

A represents one of the radicals

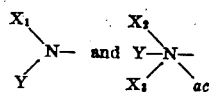

wherein $X_1$ represents a radical selected from the group consisting of hydrogen, aliphatic radicals, araliphatic, aromatic and hydroaromatic radicals, $X_2$ and $X_3$ represent the same as $X_1$ with the exception of hydrogen, Y represents the alkyl radicals of high molecular weight resulting from the alcohols of hydrogenated coconut oil, comprising mainly alkyl radicals from $C_{12}$ to $C_{14}$, and ac represents an acid radical of a quaternary nitrogen compound.

8. A process for making new amino-acid derivatives, which consists in converting a halogen acetic acid amide containing easily exchangeable halogen and having the formula

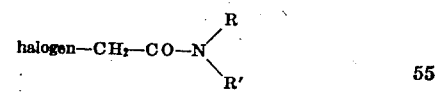

in which

R represents a radical selected from the group consisting of hydrogen, alkyl groups with fewer than 6 carbon atoms, aralkyl and aryl groups, R' represents a radical selected from the group consisting of alkyl groups with fewer than 6 carbon atoms, cycloalkyl, aralkyl and aryl groups, into an aminofatty acid derivative of the formula

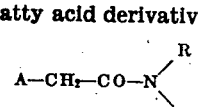

in which

A represents the radical

wherein
X₁ represents a radical selected from the group consisting of hydrogen, aliphatic radicals, araliphatic, aromatic and hydroaromatic radicals, and
Y represents the alkyl radicals of high molecular weight resulting from the alcohols of hydrogenated coconut oil, comprising mainly alkyl radicals from $C_{12}$ to $C_{14}$, and converting the product so obtained into a water soluble form by formation of a salt or a quaternary ammonium compound.

9. A process for making new amino-acid derivatives, which consists in converting a halogen acetic acid amide containing easily exchangeable halogen and having the formula $$\text{halogen}-CH_2-CO-N\begin{matrix}R\\R'\end{matrix}$$

in which
R represents a radical selected from the group consisting of hydrogen, alkyl groups with fewer than 6 carbon atoms, aralkyl and aryl groups,
R' represents a radical selected from the group consisting of alkyl groups with fewer than 6 carbon atoms, cycloalkyl, aralkyl and aryl groups,
into an aminofatty acid derivative of the formula $$A-CH_2-CO-N\begin{matrix}R\\R'\end{matrix}$$

in which A represents an amine selected from the group of primary and secondary aliphatic, araliphatic, aromatic and hydroaromatic amines, whereby the aliphatic radicals present contain at most 6 carbon atoms, and introducing the high molecular weight alkyl radical resulting from the alcohols of hydrogenated coconut oil, comprising mainly alkyl radicals from $C_{12}$ to $C_{14}$, by alkylation or aralkylation with an agent containing this group.

10. A process for preparing new amino-acid derivatives, which consists in reacting chloracetic acid dimethylamide with lorylamine and converting the product into a water soluble salt.

11. A process for preparing new amino-acid derivatives, which consists in reacting chloracetic acid dimethylamide with lorylamine and converting the product by alkylation into a quaternary compound.

12. A process for preparing a new amino-acid derivative, which consists in reacting dimethylamino acetic acid monoethylamide with loryl bromide.

13. As new products the amino-acid derivatives of the formula $$A-C_nH_{2n}-CO-N\begin{matrix}R\\R'\end{matrix}$$

in which
R represents a radical selected from the group consisting of hydrogen, alkyl groups with fewer than 6 carbon atoms, aralkyl and aryl groups,
R' represents a radical selected from the group consisting of alkyl groups with fewer than 6 carbon atoms, cycloalkyl, aralkyl and aryl groups,
n means one of the numbers 1, 2 and 3, and
A represents one of the radicals $$\begin{matrix}X_1\\ \diagdown\\N-\\ \diagup\\Y\end{matrix} \text{ and } \begin{matrix}X_2\\ \diagdown\\Y-N-\\ \diagup\quad\diagdown\\X_3\quad ac\end{matrix}$$

wherein
X₁ represents a radical selected from the group consisting of hydrogen, aliphatic radicals, araliphatic, aromatic and hydroaromatic radicals,
X₂ and X₃ represent the same as X₁ with the exception of hydrogen,
Y represents an alkyl radical of high molecular weight containing more than 6 carbon atoms, including both saturated and unsaturated radicals, and
ac represents an acid residue of a quaternary nitrogen compound,
including salts of the products in which
A represents the radical $$\begin{matrix}X_1\\ \diagdown\\N-\\ \diagup\\Y\end{matrix}$$

14. As new products the amino-acid derivatives of the formula $$A-C_nH_{2n}-CO-N\begin{matrix}R\\R_1\end{matrix}$$

in which
R represents a radical selected from the group consisting of hydrogen, alkyl groups with fewer than 6 carbon atoms, aralkyl and aryl groups,
R' represents a radical selected from the group consisting of alkyl groups with fewer than 6 carbon atoms, cycloalkyl, aralkyl and aryl groups,
n means one of the numbers 1, 2 and 3, and
A represents one of the radicals $$\begin{matrix}X_1\\ \diagdown\\N-\\ \diagup\\Y\end{matrix} \text{ and } \begin{matrix}X_2\\ \diagdown\\Y-N-\\ \diagup\quad\diagdown\\X_3\quad ac\end{matrix}$$

wherein
X₁ represents a radical selected from the group consisting of hydrogen, aliphatic radicals, araliphatic, aromatic and hydroaromatic radicals,
X₂ and X₃ represent the same as X₁ with the exception of hydrogen,
Y represents the alkyl radicals of high molecular weight resulting from the alcohols of hydrogenated natural fats, oils, waxes, resins and naphthenic acids, and
ac represents an acid residue of a quaternary nitrogen compound,
including salts of the products in which
A represents the radical $$\begin{matrix}X_1\\ \diagdown\\N-\\ \diagup\\Y\end{matrix}$$

15. As new products the amino-acid derivatives of the formula $$A-C_nH_{2n}-CO-N\begin{matrix}R\\R'\end{matrix}$$

in which
R represents a radical selected from the group consisting of hydrogen, alkyl groups with fewer than 6 carbon atoms, aralkyl and aryl groups,
R' represents a radical selected from the group consisting of alkyl groups with fewer than 6 carbon atoms, cycloalkyl, aralkyl and aryl groups, $n$ means one of the numbers 1, 2 and 3, and A represents one of the radicals

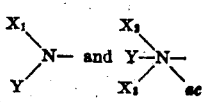

wherein $X_1$ represents a radical selected from the group consisting of hydrogen, aliphatic radicals, araliphatic, aromatic and hydroaromatic radicals, $X_2$ and $X_3$ represent the same as $X_1$ with the exception of hydrogen, Y represents the alkyl radicals of high molecular weight resulting from the alcohols of hydrogenated coconut oil, comprising mainly alkyl-radicals from $C_{12}$ to $C_{14}$, and $ac$ represents an acid residue of a quaternary nitrogen compound, including salts of the products in which A represents the radical

16. The amino-acetic acid amides of the formula

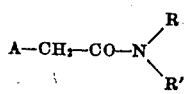

in which

R represents a radical selected from the group consisting of hydrogen, alkyl groups with fewer than 6 carbon atoms, aralkyl and aryl groups, R' represents a radical selected from the group consisting of alkyl groups with fewer than 6 carbon atoms, cycloalkyl, aralkyl and aryl groups, A represents one of the radicals

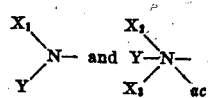

wherein $X_1$ represents a radical selected from the group consisting of hydrogen, aliphatic radicals, araliphatic, aromatic and hydroaromatic radicals, $X_2$ and $X_3$ represent the same as $X_1$ with the exception of hydrogen, Y represents the alkyl radicals of high molecular weight resulting from the alcohols of hydrogenated coconut oil, comprising mainly alkyl-radicals from $C_{12}$ to $C_{14}$, and $ac$ represents an acid residue of a quaternary nitrogen compound, including salts of the products in which A represents the radical

17. As new products the amino acetic acid amides of the formula

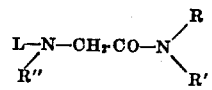

in which

L represents the radicals of technical dodecyl alcohol and

R, R' and R" represent members of the group consisting of hydrogen and lower alkyl, and its water soluble salts and alkylation products.

18. As new products dodecylamino acetic acid dimethylanilide made from technical dodecylalcohol, and its salts and alkylation compounds.

19. As new products dodecylamino actic acid ethylamide made from technical dodecylalcohol, and its salts and alkylation compounds.

20. As new product the bromide of N-dimethyl-N-dodecyl-aminoacetic acid dimethylamide made with technical dodecylalcohol, of the probable formula

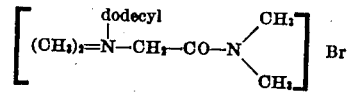

MARTIN ISELIN.
JAKOB BINDLER.